United States Patent [19]

Manos

[11] 4,080,743

[45] Mar. 28, 1978

[54] MEMBRANE DRYING PROCESS

[75] Inventor: Philip Manos, Wilmington, Del.

[73] Assignee: E. I. Du Pont de Nemours and Company, Wilmington, Del.

[21] Appl. No.: 698,696

[22] Filed: Jun. 22, 1976

[51] Int. Cl.² ............................................. B01D 31/00
[52] U.S. Cl. ............................................. 34/9; 55/16; 210/500 M; 264/344
[58] Field of Search ............ 210/500 M, 23 H, 321 R; 55/16; 264/41, 330, 340, 344; 34/9; 260/2.5 A

[56] References Cited

U.S. PATENT DOCUMENTS

| | | | |
|---|---|---|---|
| 3,342,729 | 9/1967 | Strand | 55/16 X |
| 3,592,672 | 7/1971 | Rowley et al. | 210/500 M X |
| 3,710,945 | 1/1973 | Dismore | 210/500 M X |
| 3,822,202 | 7/1974 | Hoehn | 210/23 H |
| 3,899,309 | 8/1975 | Hoehn et al. | 55/16 |

*Primary Examiner*—Frank A. Spear, Jr.

[57] ABSTRACT

Process for drying a water-wet membrane by contacting with a solution of water miscible and water immiscible solvents and then removing the solution.

6 Claims, No Drawings

MEMBRANE DRYING PROCESS

BACKGROUND OF THE INVENTION

Separation processes such as dialysis, ultrafiltration, and reverse osmosis have been used in the separation of a wide variety of impurities from solutions. The development and improvement of membranes for such systems has permitted their use, for example, in the desalination of brackish and saline waters.

The eminent success of the membranes used in permselective applications has prompted consideration of their use in the separation of gases. Such membranes are generally prepared in a water-wet condition, and various techniques have been tested for the removal of the water to dryness. Direct drying techniques, however carefully controlled, seem unsatisfactory. The replacement of the water with a series of polar and non-polar liquids has met with some success in the drying of cellulose acetate membranes. However, attempts to dry the highly desirable membranes of polymers having high surface tension have resulted in the destruction of the membrane structure that is critical to the function of such separatory membranes, and the multiple step drying of cellulose acetate membranes represents a costly and time-consuming procedure.

SUMMARY OF THE INVENTION

The instant invention provides an efficient process for drying water-wet separatory membranes which results in substantial retention of the structure necessary for separatory performance and makes practical their use in gas separation applications where high gas flux is required.

Specifically, the instant invention provides an improvement in the process for drying water-wet, semipermeable, polymeric membranes by contacting the membrane with at least one replacement liquid to substantially completely remove water from the membrane and removing the replacement liquid from the membrane, which improvement comprises first contacting the water-wet membrane with at least one replacement liquid consisting essentially of a homogeneous solution of (a) a major portion of at least one organic solvent substantially immiscible with water and (b) a minor portion of at least one organic solvent substantially miscible with water having a hydrogen bonding parameter of at least about 1.5 (calories per cubic centimeter)$^{1/2}$, wherein the components of the replacement liquid each exhibit, at 20° C, a viscosity of less than about 10 centipoise and a molar volume of less than about 200 cubic centimeters per mole.

DETAILED DESCRIPTION OF THE INVENTION

Membranes which can be dried according to the instant invention include any semi-permeable membrane which relies at least in part on physical structure for its performance. Included are membranes which are asymmetric, being formed with a relatively dense skin on one surface of a more porous structure.

A wide variety of organic polymers can be used in the preparation of membranes which can be dried according to the process of this invention. Included are membranes of aliphatic polyamides, such as those of methoxymethyl nylons described by Hookway et al. in United Kingdom patent specification No. 816,572 and of aromatic polyamides such as those described by Cescon et al. in U.S. Pat. No. 3,551,331 and those described by Richter et al. in U.S. Pat. No. 3,567,632, by Ikeda et al. in U.S. Pat. No. 3,878,109, by McKinney et al. in U.S. Pat. No. 3,904,519, by Rio in U.S. Pat. No. 3,686,116, by Blanchard et al. in U.S. Pat. No. 3,619,424, and by Wrasidlo in U.S. Pat. No. 3,816,303, and of other nitrogen-linked aromatic polymers such as polyimidazopyrrolones, polybenzimidazoles, polybenzimidazolones, polybenzoxazoles, polybenzothiazoles, polyimides, poly(ester-amides), poly(ether-amides), and polyureas. Still other specific membranes which can be dried by the instant process include those prepared from polyamides comprising the reaction products of piperazine and a dihalide of fumaric acid or of a substituted fumaric acid and from polyamides comprising the reaction products of a piperazine with a dicarboxylic acid or acid anhydride described by Credali in U.S. Pat. No. 3,696,031. Sulfonated poly(arylene ether sulfone) membranes which can be dried according to the instant invention include those prepared according to the teaching of Bournagel in U.S. Pat. No. 3,855,122 as well as Graef et al. in U.S. Pat. No. 3,875,096. Sulfonated poly(xylylene oxide) membranes which can also be so dried include those described by Salemme in U.S. Pat. No. 3,735,559. Membranes based on such polymers containing amide linkages, in particular those containing aromatic carboxamide linkages, constitute a particularly valuable class of polar membranes that can be advantageously dried by the method of this present invention. Membranes of nitrogen-linked aromatic polymers containing ether or sulfone linkages can also be dried by this method.

Still other membranes which can be effectively dried using the instant process including those prepared from cellulose acetate such as those described in Loeb et al., U.S. Pat. Nos. 3,133,132 and 3,283,042.

The instant invention is particularly beneficial for drying membranes of polymers characterized by a Critical Surface Tension of at least about 42 dynes per centimeter. The Critical Surface Tensions of polymers are measured by techniques described by Baier and Zisman in Macromolecules, Volume 3, pages 462 to 468, 1970, employing glycerine, 2,2'-thiodiethanol, diiodomethane, and 1-bromonaphthalene, for example, as spreading liquids. Three to five measurements are made of the advancing contact angle of each liquid on a polymer surface as described by Shafrin and Zisman in the Journal of Colloid Science, Volume 7, pages 166 to 177, 1952, and the extrapolated surface tension at zero contact angle is calculated by linear regression (minimum sum of squares of deviations method). Similar procedures are described in "Contact Angle, Wettability and Adhesion," R. F. Gould, editor, Advances in Chemistry Series No. 43, American Chemical Society, Washington, 1964, especially at pages 12 to 22. A recent tabulation of polymer Critical Surface Tension values, some of which were determined by procedures different from that described above, is given in "Polymer Handbook," Second Edition, J. Bandrup and E. H. Immergut, editors, Wiley, New York, 1975, at pages III-221 to III-228.

Membranes of polymers having Critical Surface Tensions below about 42 dynes per centimeter can also be dried by the techniques of the present invention process.

The high Surface Tension membranes are generally prone to shrinkage when subjected to certain drying techniques previously used. Shrinkage is readily observable as a decrease in the exposed area or a decrease in at least one linear dimension where the membrane is unrestrained as in a self-supporting film or a hollow fiber. Such dimensional change may not be evident where the membrane is restrained, as in the form of a permselective structure. In all these cases, however, the membranes exhibit a marked depreciation in flux when tested in gas separation applications.

The membrane can be in any form presenting a surface suitable for its permselective use, such as self-supporting films, hollow fibers and composite structures wherein the permselective polymer surmounts and is supported by a structure of a different composition, such as a porous polymer, glass, or ceramic. Hollow fiber membranes present high surface areas and are preferred.

The membranes dried by the instant process are water-wet. In the context of the present invention, the term water-wet is understood to mean that a major portion, that is, at least about 50 weight percent of the liquid with which the membrane is wet is water. The remainder of the liquid with which the membrane is wet can be any polar or non-polar liquid, but more satisfactory results are generally obtained when the remainder of the membrane wetting liquid is a polar liquid, especially those selected from water soluble alcohols and polyols having from 1 to 4 carbon atoms. As will be readily apparent to those skilled in the art, the advantages of the instant invention are most fully utilized when the membrane wetting liquid comprises substantially pure water.

In the course of this process the membranes may become wet with aqueous liquids containing less than 50% water, but in all cases the membrane is contacted with one or more water replacement liquids in sufficient steps to remove substantially all water from the membrane. Accordingly, the water replacement liquid in the last water replacement step is substantially water-free and the resulting liquid-wet membrane contains so little water that the properties of the dry membrane obtained after the remaining steps in the process are not significantly affected thereby.

In accordance with the various embodiments of the instant invention, the water-wet membrane is contacted with at least one water replacement liquid, each replacement liquid being the specified mixture of water miscible and water immiscible solvents, an organic solvent, or an aqueous solution of the solvent or solvent mixture. The replacement liquid should be sufficiently inert to both the membrane and the components of the membrane wetting liquid to avoid any significant depreciation of membrane properties. In addition, the organic solvents should be capable of penetrating the membrane, having suitably low viscosity and small molar volume. Those organic solvents having a viscosity of less than about 10 centipoise and a molar volume less than about 200 cubic centimeters per mole at 20° C are generally capable of penetrating the semipermeable membranes to which the invention is applicable. Especially good performance characteristics are obtained when the viscosity of the organic solvent is less than about 6 centipoise and the molar volume is not greater than about 125 cubic centimeters per mole. Molar volumes of many liquids are tabulated by Hansen and Beerbower in an article "Solubility Parameters" in the Kirk-Othmer "Encyclopedia of Chemical Technology," Second Edition, Supplementary Volume, pages 889 to 910, Wiley, New York, 1971, and by Barton in Chemical Reviews, Volume 75, pages 731 to 753, 1975.

The major portion of the solution with which the water-wet membrane is first contacted consists of at least one organic solvent substantially immiscible with water. A major portion is understood to mean at least 50 weight percent. The term water-immiscible is understood to mean that the solvent exhibits a solubility in water at least about 5% by weight less than the water-miscible component of the solution. Preferably this component exhibits a solubility in water of less than about 2%, and particularly satisfactory results are obtained with solvents having a water solubility of less than about 1%, at ambient conditions. The water-immiscible solvents used are preferably substantially non-polar. Representative water-immiscible solvents which can be used include hydrocarbons having from 4 to 8 carbon atoms, for example, alkanes and alkenes, benzene, toluene and xylenes; halocarbons having from 1 to 6 carbon atoms, for example, methylene chloride, chloroform, carbon tetrachloride, 1,2,2-trichloroethylene, 1,1,2-trichloro-1,2,2-trifluoroethane, 1,2-dichloro-1,1,2,2-tetrafluoroethane and chlorobenzene; and thiocarbons such as carbon disulfide. Of these, 1,1,2-trichloro-1,2,2-trifluoroethane has been found to give particularly satisfactory results. The solvent will, of course, be selected for inertness to the particular membrane and membrane-wetting liquid used.

The homogeneous solution with which the water-wet membrane is first contacted further comprises a minor portion, that is, about from 1% to 50%, and preferably about from 2% to 10% of at least one organic solvent substantially miscible with water. The term water-miscible is understood to mean that the solvent exhibits a solubility in water at least about 5% by weight at ambient conditions. Preferably the solubility of the water-miscible component is greater than about 20% by weight at ambient conditions, and completely miscible solvents are especially satisfactory. Representative water-miscible liquids include alkanols having from 1 to 4 carbon atoms, such as methanol, ethanol and isopropanol; certain ethers having from 2 to 6 carbon atoms such as diethyl ether, dioxane and tetrahydrofuran; glycol ethers having from 3 to 6 carbon atoms such as methoxyethylene glycol, methoxydiethylene glycol and methoxypropylene glycol; ketones having from 3 to 6 carbon atoms such as acetone and methyl ethyl ketone; carboxylic acids having from 1 to 4 carbon atoms such as acetic acid; certain esters having from 2 to 6 carbon atoms such as ethyl acetate and methoxyethylene glycol acetate; nitriles having from 2 to 4 carbon atoms such as acetonitrile; and sulfones such as tetramethylene sulfone. Of these, alkanols having from 1 to 4 carbon atoms and ethers having from 2 to 6 carbon atoms are preferred, and methanol and isopropanol have been found to give particularly satisfactory results.

In order for such an organic solvent in a replacement liquid to be polar enough in nature for substantial miscibility with water, this solvent should exhibit a hydrogen bonding parameter of at least about 1.5 (calorie per cubic centimeter)$^{1/2}$, as determined by techniques known to those skilled in the art. The maximum hydrogen bonding parameter is not critical to the invention, but will generally not exceed about 11 (calories per cubic centimeter)$^{1/2}$. The hydrogen bonding parameters of many liquids are tabulated by Hansen and Beerbower and by Barton in the references cited above.

It has been found that an important function of the replacement liquid can be the lowering of the surface tension of the membrane wetting liquid. Accordingly, the air-liquid surface tension of the water-miscible organic solvent in the replacement liquid is preferably less than about 35 dynes per centimeter at 20° C and more preferably less than about 30 dynes per centimeter.

The contacting of liquid-wet membranes with a replacement liquid can be carried out by any convenient means, including immersing, dipping, or spraying the liquid-wet membrane so that it is contacted with the replacement liquid, preferably in a series of discrete steps. The replacement liquid can also be added to a treating bath in which the membrane is submerged, with two or more steps merging into a continuous process when the addition is made over a period of time. The contacting is generally carried out at ambient temperatures and pressures. However, sub-ambient temperatures of about from 0° to −15° C can frequently result in membranes having particularly desirable permeation characteristics.

The period that the liquid-wet membrane should be contacted will vary with the types and concentrations of the organic solvents in the replacement liquids of the instant process, but should generally be adjusted to obtain substantial equilibrium between the replacement liquid and the membrane. Substantial equilibrium is generally obtained in from 1 to 24 hours of immersion, but excellent results can be obtained in shorter contact times.

The proportion of replacement liquid to membrane water can vary widely. In general, in any one contact about from 1 to 500, more usually 10 to 200, volumes of replacement liquid per volume of membrane water are used. While larger and smaller volumes can be used in any particular step, they are not always convenient to handle. As with extractions in general, a multiplicity of extractions at convenient to handle volume ratios are more efficient than a single extraction involving a relatively large volume ratio.

Contacting of the membrane is continued until water is substantially completely removed. This can be effected by repeated contacts with different batches of the same or a different replacement liquid or by continuous removal of water from a single replacement liquid. For example, after initial contact with the mixture of water-miscible and water-immiscible solvents, the removal of water can be completed by further contacts with a water miscible solvent alone. Water can be removed from a replacement liquid by simple phase separation techniques using decanting or centrifuging. Some replacement liquids, such as methanol in 1,1,2-trichloro-1,2,2-trifluoroethane, can be recovered as an azeotrope which can be reused in the instant process without further separation.

A particularly satisfactory method for removing water from the instant process involves contacting the treating bath with a desiccant which interacts with water to form a separate phase. Such materials include those that form hydrates such as sodium sulfate. The water-containing solvent mixture can also be contacted with a water-absorbing material such as natural clay, diatomaceous earth, silica or alumina gel. Particularly satisfactory synthetic desiccants are those molecular sieves commercially available from the Linde Division of Union Carbide Corporation as Types 3A, 4A and 5A, as well as those described by Hersh in "Molecular Sieves," Reinhold, New York (1961). In one embodiment of the process of the instant invention, water and small amounts of methanol are adsorbed from their mixture with 1,1,2-trichloro-1,2,2-trifluoroethane by Type 3A and/or 4A molecular sieves and the mixture is subsequently contacted with Type 5A molecular sieve to adsorb remaining amounts of methanol.

In the instant process the replacement liquid is removed from the membrane after substantially complete removal of water from the originally water-wet membrane. The replacement liquid can be removed by contacting the liquid-wet membrane with another organic solvent or a series of solvents in one or more steps and thereby obtain the membrane wet with a liquid which can be evaporated without significant effect on the permselective properties of the resulting dry membrane and then to evaporate the liquid by conventional techniques at atmospheric or reduced pressure.

Liquids which can be so evaporated typically have low surface tension, are non-polar and water-immiscible, and are capable of penetrating the membrane. They thus generally have a surface tension less than about 35 dynes per centimeter, a hydrogen bonding parameter less than about 3.0 (calories per cubic centimeter)$^{1/2}$, and an internal pressure less than about 100 calories per cubic centimeter. The internal pressures of organic solvents can be measured directly or can be estimated from the dispersion and polar components of three-dimensional solubility parameters as described by Bagley, Nelson, and Scigliano in the Journal of Paint Technology, Volume 43, pages 35 to 42, 1971, employing solubility parameter values such as those tabulated by Hansen and Beerbower and by Barton in the references cited above. Organic solvents which can be evaporated directly include, for example, benzene, carbon disulfide, methylene chloride, chloroform, carbon tetrachloride, 1,2-dichloroethane, 1,1,1-trichloroethane, and trichloroethylene.

Such liquids preferably have a surface tension less than about 25 dynes per centimeter, a hydrogen bonding parameter less than about one (calorie per cubic centimeter)$^{1/2}$, and an internal pressure less than about 70 calories per cubic centimeter. Examples include aliphatic and cycloaliphatic hydrocarbons having from four to eight carbon atoms and chlorofluorocarbons having one to three carbon atoms, including 1,2-dichloro-1,1,2,2-tetrafluoroethane. Of these, 1,1,2-trichloro-1,2,2-trifluoroethane has been found to give particularly satisfactory results.

A useful dry membrane can be obtained by evaporating the water replacement liquid of the last water replacing step in the process when such evaporation has a sufficiently small efect on the permselective separation properties of the resulting dry membrane. Thus, a water replacement liquid organic solvent can be used which can be evaporated without significant effect on the permselective properties of the resulting dry membrane and this solvent can be evaporated without replacement.

This invention provides a balance of parameters which have been found to be operative in causing reductions in gas permeabilities of certain permselective membranes dried by other processes in which aqueous membrane liquids are replaced by nonaqueous liquids. These parameters apparently involve a balancing of the rates at which nonaqueous components of the replacement liquids are introduced into the membranes and the rates at which water is removed from the membranes. The invention process employs, in the replacement liquids, water-miscible organic solvents which penetrate into membrane structures wet with aqueous liquids, to produce membrane wetting liquids having reduced surface tensions. This process further employs such solvents in homogeneous combination with organic solvents substantially immiscible with water.

The instant process permits the drying of water-wet, porous, asymmetric permselective membranes without destruction of the porous structure that is critical to their selective properties. Accordingly, the dried membranes are particularly effective in the separation of gaseous mixtures, with excellent permeation rates and selectivities. Representative of such gaseous mixtures are those found in a wide variety of industrial exhaust streams. For example, the membranes resulting from the instant process can be used to markedly increase the concentration of hydrogen in mixtures of hydrogen, nitrogen, methane, argon and ammonia typically resulting from the synthesis of ammonia. In addition, the dry membranes can be used for the separation of hydrogen and carbon monoxide, helium from natural gases such as air, hydrogen from petrochemical process streams, oxygen from air and, in general, the separation of one rapidly diffusing gas from less permeable gases.

The invention is further illustrated by the following specific examples, in which weights and percentages are by weight unless otherwise indicated.

The permselective membranes A to I having the form and dimensions listed in Table I were used in the Examples. Cellulose acetate film membrane A was an asymmetric membrane commercially available from Eastman Kodak Company and designated RO-98. Cellulose acetate film membrane B was a ROGA membrane on a fabric support. Aromatic polyamide and poly(amide/hydrazide) membranes C through I were asymmetric membranes prepared as described by Richter and Hoehn in U.S. Pat. No. 3,567,632, made from polymers containing phenylenediamine and dicarboxylic acid moieties in substantially equal numbers. Membrane C was made from a polymer containing one pendant sulfonic acid group for each approximately 1300 units of molecular weight. Membranes D through G were made from polymers containing one pendant sulfonic acid group for each approximately 2270 units of molecular weight. Membrane H was made from a polymer containing substantially equal numbers of amide and hydrazide groups. The membranes were wet with water and contained about from 50 to 70% water (based on total weight) after blotting with adsorbent paper to reduce the amount of surface water.

TABLE I

| Membrane | polymer | Membrane Form | Dimensions |
| --- | --- | --- | --- |
| A | Cellulose acetate | Film | 0.0038 inch thick |
| B | Cellulose acetate | Film | 0.008 inch thick, including fabric support |
| C | Aromatic polyamide | Film | — |
| D | Aromatic polyamide | Fiber | Outside diameter 97.7 microns<br>Inside diameter 77.7 microns |
| E | Aromatic polyamide | Fiber | Outside diameter 85 microns<br>Inside diameter 43 microns |
| F | Aromatic polyamide | Film | 0.004 inch thick |
| G | Aromatic polyamide | Film | — |
| H | Aromatic poly (amide/hydrazide) | Film | — |
| I | Aromatic polyamide | Film | — |

The gas separation permeation properties of the dried film membranes resulting from the Examples and reported in Tables II and III were determined with a circular portion of each membrane having an area of approximately 10 square centimeters mounted in a pressure cell. The cell was first flushed with helium and the equilibrium rate of helium permeation through the membrane was determined at ambient temperature with an applied pressure of 400 psig. The cell was then flushed with nitrogen and the equilibrium rate of nitrogen permeation was determined with the same applied pressure. The observed permeation rates in seconds per cubic centimeter were converted into nano-Gas Transmission Rate (nGTR) units (cubic centimeters of gas permeated per second per square centimeter of effective membrane area per centimeter mercury of gas pressure $\times 10^{-9}$) assuming the gas transmission rate to be proportional to membrane area and applied pressure.

The gas separation permeation properties of the dried hollow fiber membranes resulting from the Examples and also given in Table II were determined similarly, using as the membrane a single loop of a 150-fiber skein 18 inches long (making 300 fibers, each 9 inches long, as the arms of a U-tube) sealed into a metal tube having facilities for flushing with test gas and for collecting gas from the open bores of the hollow fiber membranes. The gas transmission rates were calculated from the observed permeation rates in seconds per cubic centimeter, assuming the effective area of the fiber membranes to be the logarithmic means of the outside and inside diameters. Selectivities for separating helium from nitrogen (helium/nitrogen) were calculated as the ratios of the observed permeation rates.

EXAMPLES 1 AND 2

Portions of Membrane A each measuring about 8 by 10 centimeters were immersed in about 400 milliliters of mixtures of 1% and 5% n-butanol with 99% and 95% commercial hexane, in Examples 1 and 2, respectively. After standing overnight at ambient temperature, the membranes were removed from the solvent mixtures and the adherent associated liquids were evaporated at ambient temperature under reduced pressure in a stream of nitrogen.

EXAMPLE 3

A portion of Membrane A measuring about 8 by 10 centimeters was immersed in about 400 milliliters of a mixture containing 2% methanol and 98% 1,1,2-trichloro-1,2,2-trifluoroethane by weight for about 72 hours at ambient temperature. A second supernatant phase formed. About 50 grams of Davison Chemical Company Type 4A molecular sieves were added after about 24 hours. The membrane was removed from the solvent mixture containing the molecular sieves after about 72 hours and the associated adherent liquid was evaporated at ambient temperature into air.

EXAMPLES 4 AND 5

Portions of Membrane A and Membrane C each measuring about 8 by 10 centimeters were immersed in about 400 milliliters of mixtures of 5% methanol and 95% 1,1,2-trichloro-1,2,2-trifluoroethane by volume containing about 50 grams of Type 3A molecular sieves. After standing about 16 hours at ambient temperature, the membranes were removed from the solvent mixture and the associated adherent liquids were evaporated at ambient temperature under reduced pressure in a stream of nitrogen.

EXAMPLES 6A AND 6B

Portions of Membrane D were wrapped around glass cylinders about 5 centimeters in diameter and 15 centimeters long. Duplicate cylinders were immersed in about 500 milliliters of a mixture of 5% methanol and 95% 1,1,2-trichloro-1,2,2-trifluoroethane by volume in a substantially filled vessel. A supernatant second phase formed. About 500 milliliters of the same solvent mixture was added to the vessel after about 30 minutes, causing the supernatant second liquid to overflow. A second portion of the solvent mixture was added to the vessel in the same way after about 2 hours, leaving the vessel substantially free of the supernatant second phase. After standing overnight at ambient temperature, the cylinders wrapped with the hollow fiber membranes were removed from the resulting solvent mixture and immersed in about 500 milliliters of 1,1,2-trichloro-1,2,2-trifluoroethane containing about 50 grams of Type 5A molecular sieves. After 6 days the cylinders and wrapped hollow fiber membranes were removed and the associated adherent liquids were evaporated at ambient temperature under reduced pressure in a stream of nitrogen.

EXAMPLES 7 AND 8

Portions of Membrane A and Membrane H about 8 by 10 centimeters were fastened with rubber bands to the outside of glass cylinders about 8 centimeters long and 4.5 centimeters in diameter, with the more dense "skin" side of the membrane toward the glass. The cylinders with the attached membranes were immersed in about 400 milliliters of a stirred $-30°$ C. mixture of 10% methyl alcohol and 90% 1,1,2-trichloro-1,2,2-trifluoroethane by volume containing bags holding about 50 grams of Type 3A molecular seives. The solvent mixture was allowed to warm to ambient temperature during about 1 hour. The cylinders with the attached membranes were then immersed over a weekend in about 400 milliliters of 1,1,2-trichloro-1,2,2-trifluoroethane containing about 50 grams of Type 5A molecular sieves. The associated adherent liquid was then evaporated under reduced pressure in the presence of Type 3A molecular sieves.

EXAMPLES 9 AND 10

The procedures of Examples 7 and 8 were repeated except that all procedures were carried out at ambient temperature.

EXAMPLE 11

A portion of Membrane H was fastened to a glass cylinder as in Examples 7 and 8. The cylinder with the attached membrane was immersed for 18 hours in about 400 milliliters of a stirred ambient temperature mixture of 13 parts of methyl alcohol and 100 parts of methylene chloride by volume containing about 50 grams of Type 3A molecular sieves. There was no visible change in the dimensions of the membrane. The cylinder and attached membrane was then immersed for a few minutes in ambient temperature 1,1,2-trichloro-1,2,2-trifluoroethane and the associated adherent liquid was evaporated into ambient temperature air.

EXAMPLE 12

A portion of film Membrane I was fastened to a glass cylinder as in Examples 7-10. The cylinder and membrane were immersed in about 400 milliliters of an ambient temperature mixture of 10% methanol and 90%, 1,1,2-trichloro-1,2,2-trifluoroethane by volume. A supernatant phase separated almost immediately. The second portion of 400 milliliters of the solvent mixture was added to the vessel over about 15 minutes, causing the supernatant layer to overflow as in Examples 6A dn 6B. The cylinder and membrane were then immersed for about 15 minutes in about 400 milliliters of 1,1,2-trichloro-1,2,2-trifluoroethane containing about 50 grams of Type 5A molecular sieves. The cylinder and membrane were removed from the solvent and the associated adherent liquid was evaporated under vacuum. There was no noticeable shrinkage of the membrane.

EXAMPLE 13

Portions of hollow fiber membrane E were wrapped around a stainless steel screen cylinder about 4.5 centimeters in diameter and 14 centimeters long. About 600 milliliters of a 35° C. mixture of 9% methanol and 91% 1,1,2-trichloro-1,2,2-trifluoroethane by volume was circulated for about 15 minutes at a rate of about 1 liter per minute through a vessel containing the screen cylinder and membranes and through another vessel containing about 100 grams of Type 3A molecular sieves. The mixed fluid was drained and thorough mixing of the fluids with the fiber membranes was achieved by directing the flow from the circulation pump into a distribution tube in the center of the stainless steel cylinder and by vertical oscillation of the cylinder in the vessel. 1,1,2-Trichloro-1,2,2-trifluoroethane was then circulated for about 5 minutes at 35° C. and at a rate of about 1 liter per minute through the vessel containing about 75 grams of Type 5A molecular sieves. The liquid associated with the membrane was evaporated under vacuum at 30° to 55° C. over about 30 minutes.

EXAMPLES 14 to 26

Portions of the film membranes as indicated in Table III each measuring about 7.5 by 15 centimeters were fastened at their corners onto the circumference of stainless steel screen cylinders about 7.5 centimeters long and 4.5 centimeters in diameter. Up to six such cylinders bearing membranes were simultaneously immersed in about two liters of the solvent mixtures at the temperatures and for the times listed in Table III while 80 to 160 milliliters per minute of the mixture was circulated through a tube containing about 135 grams of Type 3A molecular sieves (sufficient to absorb about 30 grams of water) and returned to the vessel containing the membranes immersed in the solvent mixture. The cylinders bearing the membranes were removed from the solvent mixture and immersed in about 400 milliliters of ambient temperature 1,1,2-trichloro-1,2,2-trifluoroethane containing about 25 grams of Type 5A molecular sieves. The cylinders and membranes were removed from the 1,1,2-trichloro-1,2,2-trifluoroethane after about 30 minutes and the associated adherent liquid was evaporated into ambient temperature air. The membranes of Examples 14 and 15B shrank by 13.0% and 2.8% in volume, respectively. The solvent mixture of Examples 16 and 17 contained 1.92% water, 36.69% methanol, and 61.27% 1,1,2-trichloro-1,2,2-trifluoroethane after treatment of the membranes and two others. The solvent mixture of Examples 18 through 20 became hazy upon immersion of the membranes and then became clear after 28 minutes circulation through molecular sieves. It contained 0.26% water, 6.64% methanol, and 93.06% 1,1,2-trichloro-1,2,2-trifluoroethane after treatment of the membranes and one other. The solvent mixture of Examples 25 and 26 through 31 became hazy upon immersion of the membranes and three others and then became clear after 12 minutes circulation through molecular sieves.

EXAMPLES 27A AND 27B

A skein of 150 hollow fibers of Membrane E about 350 centimeters long was looped and fastened inside a tube about 1 centimeter in diameter and 175 centimeters long with the open ends of the membranes extending from one end of the tube. About 700 milliliters of a mixture of 6% methanol and 94% 1,1,2-trichloro-1,2,2-trifluoroethane by volume at about 20° C was circulated through the tube and through a vessel containing about 125 grams of Type 3A molecular sieves at about 1 liter per minute. After about 30 minutes the tube containing the hollow fiber membranes was drained and the liquid remaining associated with the membranes was evaporated with a stream of nitrogen at ambient temperature under slightly reduced pressure. The solvent mixture contained 0.012% water and 1.41% methanol by volume after the treatment. Other portions of Membrane E shrank about 10% in length during similar treatments with a mixture of 8% methanol and 92% 1,1,2-trichloro-1,2,2-trifluoroethane by volume. Gas separation permeation properties were measured on two portions of the resulting dry membranes.

EXAMPLES 28and 28B

The procedures of Examples 27A and 27B were repeated except that the hollow fiber membranes were rinsed with about 250 milliliters of 1,1,2-trichloro-1,2,2-trifluoroethane and then about 600 milliliters of 1,1,2-trichloro-1,2,2-trifluoroethane was circulated at about 1 liter per minute over the membranes and through a vessel containing about 75 grams of Type 4A molecular sieves before the liquid remaining associated with membranes was evaporated. The solvent mixture first contacted with the water-wet membranes contain 0.021% water and 1.85% methanol by volume after the treatment.

EXAMPLE 29

A skein of 150 hollow fibers of Membrane E about 60 centimeters long was looped and suspended inside a vertical tube about 0.6 centimeters in diameter and 50 centimeters long. The upper end of the tube was fastened to a dropping funnel containing a mixture of 3% methanol and 97% 1,1,2-trichloro-1,2,2-trifluoroethane by volume. This mixture was passed dropwise through the tube and over the hollow fiber membranes. The effluent from the bottom of the tube formed two phases. The effluent became a single phase after passage of about 300 milliliters of the mixture through the tube during about 45 minutes. About 50 milliliters of 1,1,2-trichloro-1,2,2-trifluoroethane was then passed dropwise through the tube and the resulting liquid-wet membranes were dried at ambient temperature under reduced pressure. The dried membranes had a helium flux of 124.1 M nGTR units and a $He/N_2$ selectivity of 71.

In other similar processes, hollow fiber membranes showed increased helium flux when the solvent mixture contained less methanol and when it passed over the membranes more slowly. Under these conditions the initial effluent was substantially free of both methanol and water, indicating introduction of methanol into the water-wet membranes without significant removal of water. The 1,1,2-trichloro-1,2,2-trifluoroethane separated from the intermediate two-phase effluent was substantially free of both water and methanol and was recycled after addition of methanol. The later single-phase effluent was a mixture of methanol and 1,1,2-trichloro-1,2,2-trifluoroethane.

TABLE II

| GASEOUS PERMSELECTIVE SEPARATION PROPERTIES OF DRY MEMBRANES | | | | |
|---|---|---|---|---|
| Example | Water-Wet Membrane | Water Replacement Liquid | Helium Permeability, nGTR | Selectivity, Helium/Nitrogen |
| 1 | A | 1% n-butanol/99% hexane | 18,800 | 65 |
| 2 | A | 5% n-butanol/95% hexane | 15,350 | 63 |
| 3 | A | 2% methanol/98% 1,1,2-trichloro-1,2,2-trifluoroethane | 3,600 | 54 |
| 4 | A | 5% methanol/95% 1,1,2-trichloro-1,2,2-trifluoroethane | 5,358 | 560 |
| 5 | C | " | 1,854 | 940 |
| 6A | D | " | 13,600 | 58 |
| 6B | D | " | 21,500 | 47 |
| 7 | A | 10% methanol/90% 1,1,2-trichloro-1,2,2-trifluoroethane | 139,000 | 57 |
| 8 | H | " | 69,500 | 150 |
| 9 | A | " | 71,300 | 65 |
| 10 | H | " | 50,500 | 220 |
| 11 | H | 11.5% methanol/88.5% methylene chloride | 12,400 | * |
| 12 | I | 10% methanol/90% 1,1,2-trichloro-1,2,2-trifluoroethane | 30,900 | 104 |
| 13 | E | 9% methanol/91% 1,2,2-trichloro-1,2,2-trifluoroethane | 14,600 | 57 |
| 27A | E | 6% methanol/94% 1,2,2-trichloro-1,2,2-trifluoroethane | 36,200 | 267 |
| 27B | E | " | 39,500 | 127 |
| 28A | E | " | 39,500 | 175 |
| 28B | E | " | 46,200 | 234 |

*Nitrogen permeability too low for measurement.

TABLE III

| GASEOUS PERMSELECTIVE SEPARATION PROPERTIES OF DRY MEMBRANES | | | | | | |
|---|---|---|---|---|---|---|
| Example | Water-Wet Membrane | Water Replacement Liquid | Treatment Conditions | | Helium Permeability, nGTR | Selectivity Helium/Nitrogen |
| | | | Temp. °C | Time, Min. | | |
| 14 | A | 50% methanol/50% 1,1,2-trichloro- | −13 | 2 | 348,800 | 67 |

TABLE III-continued
GASEOUS PERMSELECTIVE SEPARATION PROPERTIES OF DRY MEMBRANES

| Example | Water-Wet Membrane | Water Replacement Liquid | Treatment Conditions Temp. °C | Time, Min. | Helium Permeability, nGTR | Selectivity Helium/Nitrogen |
| --- | --- | --- | --- | --- | --- | --- |
| 15A | A | 1,2,2-trifluoroethane " | −12 | 20 | 346,311 | 121 |
| 15B | A | " | −12 | 20 | 283,530 | 81 |
| 16 | F | " | 20.5 | 15 | 42,900 | 235 |
| 17 | F | " | 20.5 | 60 | 38,800 | 190 |
| 18 | F | 10% methanol/90% 1,1,2-trichloro-1,2,2-trifluoroethane | 22 | 30 | 29,200 | 255 |
| 19 | F | " | 22 | 60 | 33,200 | 31 |
| 20 | G | " | 22 | 60 | 46,600 | 172 |
| 21 | A | " | 22 | 30 | 22,900 | 78 |
| 22 | B | " | 22 | 30 | 101,000 | 25 |
| 23 | G | " | −10 | 30 | 52,100 | 32 |
| 24 | G | " | −10 | 60 | 44,100 | 39 |
| 25 | F | " | −10 | 60 | 28,700 | 157 |
| 26 | F | " | −10 | 60 | 31,700 | 201 |

I claim:

1. In the process for drying a semipermeable polymeric membrane that is wet with an aqueous membrane-wetting liquid by contacting the wet membrane with at least one replacement liquid to remove water from the membrane, and removing the replacement liquid from the membrane; the improvement which comprises first contacting the wet semipermeable polymeric membrane in which the polymer has a Critical Surface Tension of at least 42 dynes per centimeter with at least one replacement liquid consisting essentially of a homogeneous solution of (a) a major portion of at least one organic solvent selected from the class consisting of hydrocarbons having 4–8 carbon atoms and perchlorofluorocarbons having 1–3 carbon atoms and (b) a minor portion of at least one organic solvent substantially miscible with water having a hydrogen bonding parameter of at least about 1.5 (calories per cubic centimeter)$^{1/2}$, wherein the components of the replacement liquid each exhibit, at 20° C, a viscosity of less than about 10 centipoise and a molar volume of less than about 200 cubic centimeters per mole; and after water has been substantially completely removed from the membrane, evaporating the replacement liquid to obtain a membrane free of water and replacement liquid.

2. A process of claim wherein the water miscible solvent comprises about from 2% to 10% of the homogeneous solution.

3. A process of claim 1 wherein the water-wet membrane is an asymmetric membrane having a dense skin on one surface thereof.

4. A process of claim 1 wherein the semi-permeable membrane is selected from nitrogen-linked aromatic polymers, sulfonated poly(arylene ether sulfones), and sulfonated poly(phenylene oxides).

5. A process of claim 1 wherein the major portion of the homogeneous solution consists essentially of 1,1,2-trichloro-1,2,2-trifluoroethane and the minor portion of the homogeneous solution consists essentially of methanol.

6. A process of claim 5 wherein the resulting liquid-wet membrane is subsequently contacted with substantially pure 1,1,2-trichloro-1,2,2-trifluoroethane and the 1,1,2-trichloro-1,2,2-trifluoroethane is removed by evaporation.

* * * * *